United States Patent [19]
Martin et al.

[11] 3,855,799
[45] Dec. 24, 1974

[54] RIGID CORRUGATED TUBING

[75] Inventors: Lawrence L. Martin, Iowa City, Iowa; Ronald C. Martin, Waterville, Ohio; Marty E. Sixt, Iowa City, Iowa

[73] Assignee: Advanced Drainage Systems, Inc., Columbus, Ohio

[22] Filed: Jan. 17, 1973

[21] Appl. No.: 324,308

[52] U.S. Cl. ................ 61/11, 138/173, 138/178
[51] Int. Cl. ........................................... E02b 11/00
[58] Field of Search .................. 138/172, 173, 178; 161/133; 61/10-12

[56] References Cited
UNITED STATES PATENTS

| | | | |
|---|---|---|---|
| 1,169,689 | 1/1916 | Smith | 138/178 X |
| 1,963,056 | 6/1934 | Wilcox | 138/173 |
| 2,961,711 | 11/1960 | Diedrich et al. | 138/DIG. 7 |
| 3,043,612 | 7/1962 | Parlik et al. | 138/121 X |
| 3,374,634 | 3/1968 | Fochler | 61/10 |
| 3,578,777 | 5/1971 | DeGain | 138/173 |
| 3,715,454 | 2/1973 | Kleykamp | 138/172 |
| 3,747,352 | 7/1973 | Maroschak | 138/173 |
| 3,785,290 | 1/1974 | Castor et al. | 138/121 X |

Primary Examiner—Richard C. Queisser
Assistant Examiner—Daniel M. Yasich
Attorney, Agent, or Firm—Connolly and Hutz

[57] ABSTRACT

Longitudinally oriented rigid corrugated tube comprises alternating peak walls and valley walls with interconnecting walls extending between peak and valley walls. Selected openings are provided in tube. Stiffening rib structure is associated with at least some of tube walls for preventing flexing of tube. Stiffening rib structure includes internally and externally disposed ribs.

6 Claims, 11 Drawing Figures

PATENTED DEC 24 1974

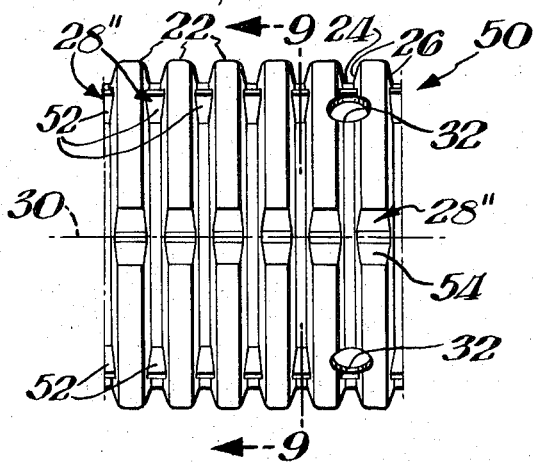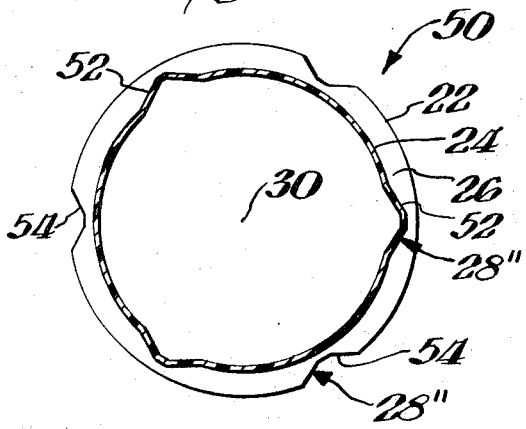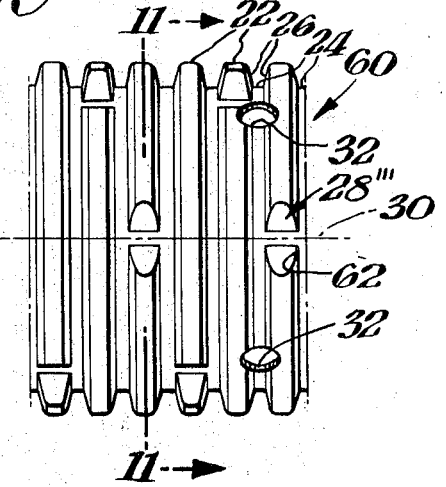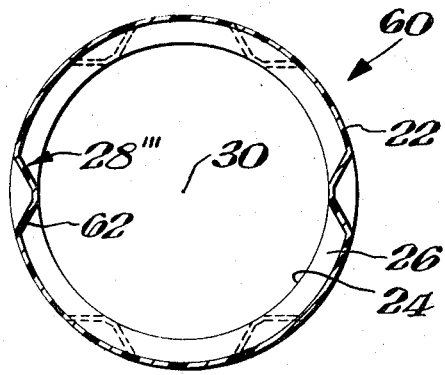

RIGID CORRUGATED TUBING

BACKGROUND OF THE INVENTION

The present invention relates to a rigid corrugated tube, and more particularly to a corrugated tube that includes stiffening rib structure that prevents the tube from flexing.

Corrugated tubing is fabricated in numerous shapes and forms for use in a variety of diverse applications. The primary factor which results in the selection of corrugated tubing is its high strength-to-weight ratio, and this ratio is achieved through the corrugated design of the tubing. For the most part, corrugated tubing is often manufactured so that it has a substantially uniform thickness throughout. The net effect of the corrugated design together with the uniform thickness provides a tube which is significantly flexible. Accordingly, such tubing may be manufactured in indefinite lengths and coiled for shipping purposes. Corrugated tubing of this general type with openings therein has met with considerable commercial success in the drainage industry for use in draining fields and other terrains in need of proper drainage.

While corrugated tubing exhibits the strength requirements for many applications, the inherent flexibility of the tubing renders it inappropriate for many uses. One such use involves the construction of septic tank leach fields. In this particular application it is extremely desirable to use corrugated tubing from the standpoint of strength but corrugated tubing is not completely desirable due to its inherent flexible nature. In septic tank leach fields it is important that the tubing be substantially rigid in addition to having the required strength. Installation of the tubing in septic tank leach fields involves accurately positioning the tubing in a trench so that the tubing has a relatively level grade. After the trench is dug, grade stakes are used to accurately position the tubing in the trench so that the stone required to bed the tubing can be filled into the trench in one operation. In the case of rigid tubing several stakes are sufficient to suspend the tubing in the trench. On the other hand, if flexible tubing is used the required grade is difficult to achieve and numerous stakes are needed since the tubing tends to sag between the stakes. Grade boards may be used in place of the stakes but rigidity of the tubing is still desirable.

For the above reasons as well as others that will become apparent, the desirability of tubing that offers the economic advantages of corrugated tubing, i.e., high strength-to-weight efficiency, with the rigidity of smooth wall pipe, is readily apparent.

SUMMARY OF THE INVENTION

Accordingly, it is an object of the present invention to provide rigid corrugated tubing.

It is another object of the present invention to provide corrugated tubing with stiffening rib structure that prevents the tubing from flexing.

In accordance with the present invention, a longitudinally oriented rigid corrugated tube comprises alternating peak walls and valley walls with interconnecting walls extending between the peak and valley walls. Stiffening rib structure is associated with at least some of the walls for preventing flexing off the tube. Preferably, the peak walls and the valley walls are annularly disposed relative to the longitudinal axis of the tube. Also, for septic tank leach fields, the tube includes selected openings therein that provide communication between inside and outside the tube.

The stiffening rib structure may include a plurality of individual external ribs spaced from one another and extending between adjacent interconnecting walls across the valley wall therebetween. Preferably, the external ribs include spaced apart ribs extend across each valley wall between the interconnecting walls adjacent thereto. Moreover, it is preferred that the ribs are parallel to the longitudinal axis of the corrugated tube.

The particular shape of the external ribs may be such that each rib extends inwardly from the interconnecting walls toward the longitudinal axis of the corrugated tube so that the mid-portion of each rib is closer to the longitudinal axis than the extremities thereof. Alternatively, the ribs may extend straight across the valley walls, each rib having a substantially uniform triangular cross section in a direction transverse to the longitudinal axis of the corrugated tube.

The stiffening rib structure may further include a plurality of individual internal ribs spaced from one another and comprising depressed portions in at least some of the peak walls. The depressed portions extend inwardly toward the longitudinal axis of the corrugated tube. Preferably, the plurality of individual internal ribs includes spaced apart ribs in each peak wall. In one aspect of the present invention, each individual internal rib comprises a depressed portion that extends inwardly to a bottom wall contiguous with the valley walls adjacent thereto.

The plurality of individual external ribs may include buttresses spaced from one another with each of the buttresses extending between a valley wall and one of the interconnecting walls adjacent thereto. Preferably, these buttresses are radially disposed relative to the longitudinal axis of the tube. Also, a portion of the individual buttresses extend between a valley wall and one of the interconnecting walls adjacent thereto while another portion of the buttresses extend between that valley wall and the other of the interconnecting walls adjacent thereto. When buttresses form stiffening rib structure, it is preferred that they extend from each valley wall to each of the interconnecting walls of each valley wall. Moreover, the individual buttress may extend from the valley walls to the outer extremity of the interconnecting walls.

BRIEF DESCRIPTION OF THE DRAWINGS

Novel features and advantages of the present invention in addition to those mentioned above will become apparent to those skilled in the art from a reading of the following detailed description in conjunction with the accompanying drawings wherein similar reference characters refer to similar parts and in which:

FIG. 8 is a fragmental side elevational view of still another rigid corrugated tube according to the present invention;

FIG. 9 is a sectional view taken along line 9—9 of FIG. 8;

FIG. 10 is a fragmental side elevational view of another rigid corrugated tube according to the present invention; and FIG. 11 is a sectional view taken along line 11—11 of FIG. 10.

DETAILED DESCRIPTION OF THE INVENTION

Figure 1:
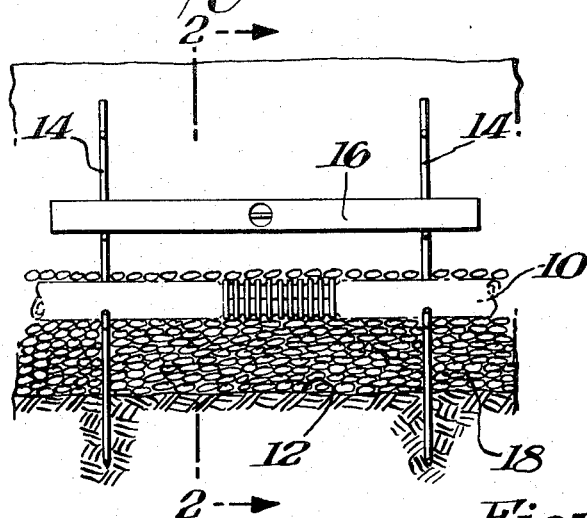
FIG. 1 is a fragmental front elevational view partially in cross section illustrating corrugated tubing installed in a septic tank leach field.
Figure 2:
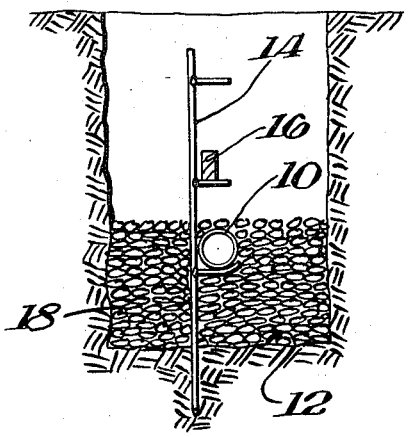
FIG. 2 is a sectional view taken along line 2—2 of FIG. 1.

Referring in more particularity to the drawing, the various figures illustrate rigid corrugated tubing having significant strength and sufficient rigidity whereby the tubing has a variety of different uses. FIGS. 1 and 2 illustrate one particular use of the tubing in the construction of septic tank leach fields. In this regard, tubing 10, according to the present invention, is suspended in a trench 12 by grade stakes 14. The grade stakes support the tubing together with a level 16 which is supported by the stakes in parallel relationship to the tubing. The stakes are simply inserted into the trench until the level 16 registers the desired grade for the tubing 10. When this is accomplished, the level is removed and the stone 18 required to bed the tubing is filled into the trench. Grade boards or other types of stakes may be used to support the tubing 10 at the desired level. Also, the stone bedding operation can be accomplished in two steps by depositing a first amount in the trench followed by supporting the tubing in the trench and then depositing a second amount of stone in and around the tubing. In each of these installation procedures it is desirable that the tubing be rigid in order to achieve the proper level or grade of the tubing. In some cases where the tubing is flexible, it tends to sag between the stakes or move laterally relative to the grade board or stakes thereby complicating the operation and increasing chances of misalignment and improper positioning of the tubing.

The tubing of the present invention is preferably fabricated of durable high-strength polyethylene although other thermoplastic materials are also suitable. Extruding techniques are used to shape the tubing by forcing molten plastic through an orifice, as is well known. The formed plastic tube is then reshaped to provide the corrugations. The tubing may be fabricated in 10 foot lengths having a diameter in the range of 4 to 8 inches, it being understood that other lengths and diameters are equally suitable.

Figures 3, 5:
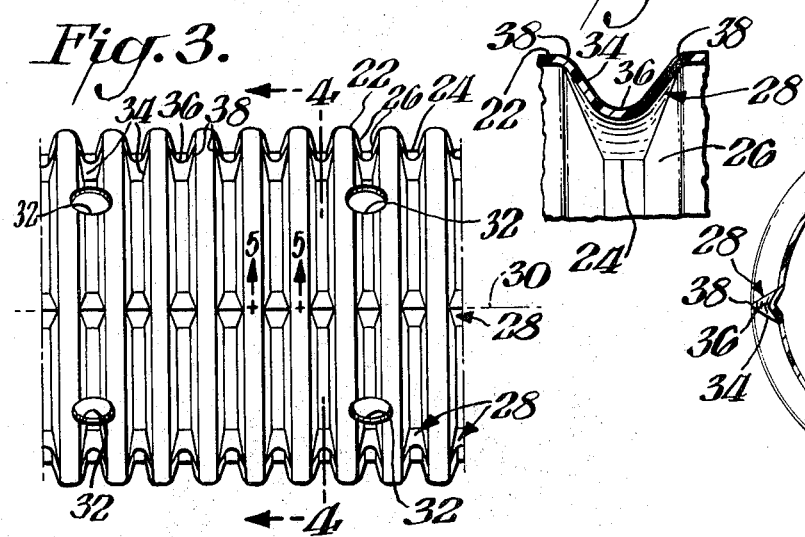
FIG. 3 is a fragmental side elevational view of rigid corrugated tubing according to the present invention.
FIG. 5 is a sectional view taken along line 5—5 of FIG. 3.
Figure 4:
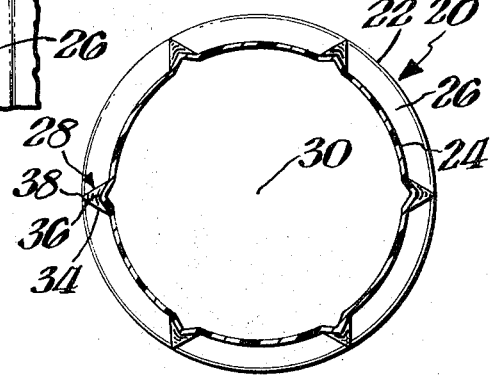
FIG. 4 is a sectional view taken along line 4—4 of FIG. 3.

FIGS. 3–5 illustrate a longitudinally oriented rigid corrugated tube 20. The tube has alternating peak walls 22 and valley walls 24 with interconnecting walls 26 extending between the peak and valley walls. Stiffening rib structure 28 is associated with at least some of the walls 22, 24, 26 to impart rigidity to the tube and thereby prevent it from flexing.

As shown in the drawing, it is preferred that the peak walls 22 and valley walls 24 are annularly disposed relative to the longitudinal axis 30 of the tube. Moreover, when the tubing is used for septic tank leach fields, a plurality of openings 32 in the tube provides communication between inside and outside the tube. The tubing 20 that provides the conduit to the septic tank leach field does not include openings 32.

Turning now to the specifics of the stiffening rib structure 28 of the corrugated tube 20, this structure includes a plurality of individuual external ribs 34 spaced from one another and extending between adjacent interconnecting walls 26 across the valley walls 24 therebetween. It is preferred that the plurality of individual external ribs 34 includes spaced apart ribs across each valley wall 24 of the tube 20 between the interconnecting walls 26 adjacent thereto. In this embodiment of the invention illustrated in FIGS. 3–5, six individual ribs 34 are associated with each valley wall 24 and the interconnecting walls 26 adjacent thereto.

Each of the individual ribs 34 is substantially parallel to the longitudinal axis 30 of the corrugated tubing 20. The particular configuration of the ribs 34 is such that each rib extends inwardly from the interconnecting walls 26 toward the longitudinal axis 30 of the corrugated tube 20 so that the mid-portion 36 of each rib 34 is closer to the longitudinal axis 30 than the extremities 38 of the rib. Generally, the mid-portion 36 of the rib 34 is located at about half the distance between the peak and valley walls while the extremities 38 of the rib 34 join the peak walls 22. This particular rib design rigidifies the tube 20 and minimizes any loss oof resistance to crushing. Preferably, the tube 20 has a uniform thickness throughout.

Figure 6:
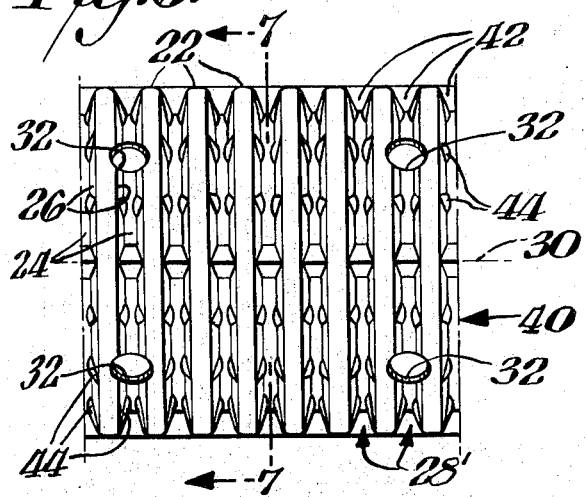
FIG. 6 is a partial elevational view of another rigid corrugated tube according to the present invention.
Figure 7:
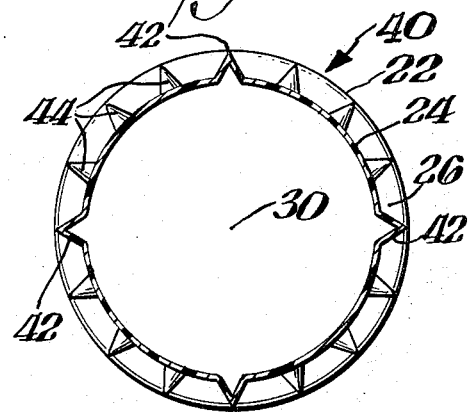
FIG. 7 is a sectional view taken along line 7—7 of FIG. 6.

FIGS. 6–7 show another longitudinally oriented rigid corrugated tube 40 of the present invention. This tube comprises alternating peak walls 22 and valley walls 24 with interconnecting walls 26 extending between the peak and valley walls. Stiffening rib structure 28' is associated with some of the walls 22, 24, 26 to impart rigidity to the tubing 40 to thereby prevent it from flexing.

Preferably, the peak walls 22 and valley walls 24 of the tube 40 are annularly disposed relative to the longitudinal axis 30 of the tube. Also, the tube 40 includes openings 32 in the tube for providing communication between inside and outside the tube.

The stiffening rib structure 28' of the tube 40 includes a plurality of individual external ribs 42 spaced from one another and extending between adjacent interconnecting walls 26 across the valley wall 24 therebetween. It is preferred that the plurality of ribs 42 includes spaced apart ribs across each valley wall 24 between the interconnecting walls 26 adjacent thereto. In the case of the tube 40, four ribs 42 are associated with each valley wall 24 of the tube.

The external ribs 42 are substantially parallel to the longitudinal axis 30 of the corrugated tube 40. Moreover, each of these external ribs has a substantially uniform triangular shaped cross section in a direction transverse to the longitudinal axis 30 of the tube 40. The outermost edge of the triangular shaped ribs 42 is contiguous with the peak walls 22 of the tube 40.

The stiffening rib structure 28' of the tube 40 further includes a plurality of individual external ribs in the form of buttresses 44. The buttresses 44 are spaced from one another and each buttress extends between a valley wall 24 and one of the interconnecting walls 26 adjacent thereto. Each buttress 44 is radially disposed relative to the longitudinal axis 30 of the tube 40. As shown in FIGS. 6 and 7, a portion of the buttresses 44 extend between a valley wall 24 and one of the interconnecting walls 26 adjacent thereto while other buttresses 44 extend between that valley and the other of the interconnecting walls adjacent thereto. Preferably, each valley wall 24 has buttresses 44 extending therefrom to each of the adjacent interconnecting walls 26. These buttresses 44 extend from the valley walls to the outer extremity of the interconnecting walls 26. The buttresses together with the other external ribs 42 stiffen and impart rigidity to the corrugated tube 40.

Each of the buttresses 44 appears as an intersection of a cone with the interconnecting wall 26. The shape of the buttresses 44 may take other forms such as rectangles, for example. Moreover, the corrugated tube 40 may have a substantially uniform thickness throughout or the thickness may be uniform with the exception of the buttresses 44 which may be solid. In either case, the corrugated tube 40 is rigidified by providing the buttresses 44.

FIGS. 8 and 9 illustrate another longitudinally oriented rigid corrugated tube 50 according to the present invention. The tube 50 comprises alternating peak walls 22 and valley walls 24 with interconnecting walls 26 extending between the peak and valley walls. Stiffening rib structure 28″ is associated with some of the walls 22, 24, 26 to rigidify the corrugated tube 50 and thereby prevent it from flexing.

As in the case of the tubes 20 and 40, the peak walls 22 and valleys walls 24 preferably are annularly disposed relative to the longitudinal axis 30 of the tube. Openings 32 are provided in the tube 50 for communication between inside and outside the tube when it is used in a septic tank leach field. The tubing 50 may be used for other purposes, such as a conduit to the septic tank leach field in which case the tube is imperforate.

The stiffening rib structure 28″ includes a plurality of individual external ribs 52 spaced from one another and extending between adjacent interconnecting walls 26 across the valley walls 24 therebetween. Preferably, the plurality of individual external ribs 52 include spaced apart ribs across each valley wall 24 between the interconnecting walls 26 adjacent thereto. In the embodiment of the invention shown in FIGS. 8 and 9, three ribs 52 are associated with each valley wall 24 and its adjacent interconnecting walls 26.

The external ribs 52 are substantially parallel to the longitudinal axis 30 of the corrugated tube 50. Moreover, each of the ribs 52 has a substantially uniform triangular shaped cross section in a direction transverse to the longitudinal axis 30 of the corrugated tube 50. As shown best in FIG. 9, the outermost boundary of each rib 52 is spaced inwardly from the peak walls 22.

The stiffening rib structure 28″ of the corrugated tube 50 further includes a plurality of individual internal ribs 54 spaced from one another and comprising depressed portions in the peak walls 22. The depressed portions that comprise the internal ribs 54 extend inwardly toward the longitudinal axis 30 of the corrugated tube 50. Preferably, as shown in FIG. 9, a plurality of individual internal ribs 54 is associated with each peak wall 22. The corrugated tube 50 includes three internal ribs 54 in each peak wall.

As noted above, the depressed portions of the internal ribs 54 extend inwardly toward the longitudinal axis 30 of the corrugated tube 50. However, the innermost part of the depressed portions that comprise the internal ribs 54 is spaced outwardly from the valley walls 24.

The internal ribs 54 together with the external ribs 52 function to rigidify the corrugated tube 50 to thereby prevent it from flexing. Preferably, the tube has a substantially uniform thickness throughout.

FIGS. 10 and 11 illustrate another longitudinally oriented rigid corrugated tube 60 according to the present invention. The corrugated tube 60 comprises alternating annular peak walls 22 and valley walls 24 with interconnecting walls 26 extending between the peak and valley walls. Stiffening rib structure 28″ is associated with at least some of the various walls of the tube 60 for rigidifying the tube and thereby prevent it from flexing.

As shown best in FIG. 10, the peak walls 22 and valley walls 24 are annularly disposed relative to the longitudinal axis 30 of the tube 50. Also, the corrugated tube includes openings 32 that provide communication from inside and outside the tube, it being understood that the openings may be omitted when imperforate rigid tubing is desired.

The stiffening rib structure 28″ includes a plurality of individual internal ribs 62 spaced from one another and comprising depressed portions in at least some of the peak walls 22. The depressed portions that comprise the individual internal ribs 62 extend inwardly toward the longitudinal axis 30 of the corrugated tube 60. Preferably, the plurality of individual internal ribs 62 includes spaced apart ribs in each peak wall 22. As shown best in FIG. 11, two internal ribs 62 are provided in each peak wall 22 of the corrugated tube 60. The pair of internal ribs 62 in each peak wall 22 are displaced from one another 180°. Also, as shown in FIGS. 10 and 11, the pair of internal ribs 62 associated with each peak wall 22 is displaced 60° from the internal ribs in the adjacent peak walls. The angular direction of displacement of the internal ribs 62 is the same from each peak wall to the next. In other words, the orientation of the internal ribs 62 in the peak walls 22 is such that every third peak wall has a similar orientation of internal ribs 62.

As shown in the drawing, the innermost part of each depressed portion comprising an internal rib 62 is contiguous with the valley walls 24 adjacent thereto. The internal ribs 62 function to rigidify the corrugated tube 60 to thereby prevent it from flexing. Preferably, the tube 60 is fabricated so that it has a uniform thickness throughout.

The significant flexing of corrugated tubing is believed to occur in the area of the interconnecting walls located between the peak and valley walls, especially where the interconnecting walls join the peak and valley walls. The external ribs of the present invention prevent flexing at these areas by securing the interconnecting walls together and/or by securing the interconnecting walls to the valley walls of the tubing. The internal ribs of the present invention also prevent flexing at these areas through elimination of portions of the interconnecting walls as well as by providing contiguous or near contiguous portions between the peak and valley walls. These contiguous or near contiguous portions function as small portions of smooth-walled tubing which is quite rigid. The net result of internal and external ribs together with various combinations thereof provides a rigid corrugated tube having a high strength-to-weight ratio and excellent rigidity. The tubing of the present invention exhibits the primary beneficial characteristics of corrugated and smooth-walled tubing and provides a synergistic effect.

What is claimed is:

1. A longitudinally oriented rigid corrugated tube comprising alternating substantially flat peak and flat valley walls with steep interconnecting walls extending between the peak and valley walls, and stiffening rib structure connected between at least some of the valley and interconnecting walls, one form of the rib structure extending to the flat peak walls and between adjacent interconnecting walls across the valley wall therebetween for preventing flexing of the tube, and another form of the stiffening rib structure including a plurality of individual external ribs in the form of buttresses spaced from one another, each of the buttresses connected between a valley wall and one of the interconnecting walls adjacent thereto and extending up to the flat peak wall.

2. A longitudinally oriented rigid corrugated tube as in claim 1 including a plurality of openings in the tube for providing communication between inside and outside the tube.

3. A longitudinally oriented rigid corrugated tube as in claim 1 wherein each of the rib structures between adjacent interconnecting walls across the valley wall therebetween extends inwardly from the interconnecting walls toward the longitudinal axis of the corrugated tube whereby the mid-portion of each such rib is closer to the longitudinal axis than the extremities thereof.

4. A longitudinally oriented rigid corrugated tube as in claim 1 wherein each of the individual buttresses is radially disposed relative to the longitudinal axis of the tube.

5. A longitudinally oriented rigid corrugated tube as in claim 4 wherein a portion of the individual buttresses extend between a valley wall and one of the interconnecting walls adjacent thereto while another portion of the individual buttresses extend between that valley wall and the other of the interconnecting walls adjacent thereto.

6. A longitudinally oriented rigid corrugated tube as in claim 5 wherein each valley wall has buttresses extending therefrom to the adjacent interconnecting walls.

* * * * *